CYCLIC INCREMENTAL DISPLAY DEVICE

Filed Sept. 25, 1964 2 Sheets-Sheet 1

EMANUEL E. BEER
ARVID W. JACOBSON
*INVENTORS*

BY S. A. Giarratana
George B. Oujevolk
ATTORNEYS

EMANUEL E. BEER
ARVID W. JACOBSON
*INVENTORS*

BY S. A. Giamatana
George B. Oujevolk
ATTORNEYS

United States Patent Office 3,223,320

Patented Dec. 14, 1965

3,223,320

CYCLIC INCREMENTAL DISPLAY DEVICE

Emanuel E. Beer, White Plains, and Arvid W. Jacobson, Millwood, N.Y., assignors to General Precision Inc., Little Falls, N.J., a corporation of Delaware Filed Sept. 25, 1964, Ser. No. 399,253

7 Claims. (Cl. 235—108)

The present invention relates to a cyclic incremental display device and more particularly to an angle counter graduated in degrees.

Cyclic incremental display devices are usually counters where the device will display incremental changes of one unit in a display window. One such device used extensively is the angle counter. As is well known to those skilled in the art, there is considerable difficulty in devising the most significant 36 positions of an angle counter, each poistion representing ten degrees. If 36 separate positions are placed on a drum, the counter is unusually large and this arrangement cannot be readily integrated with the least significant digits. To make the device small and compact, a gearing arrangement between radices, i.e., ones, tens, hundreds, must be used as well as a shield. There is, of course, the problem with the 300° to 359° group since this is a group unlike the other numbers. For many arrangements, gearing between radices is undesirable, but has come to be regarded as a necessary evil. But, extensive gearing is highly objectionable in fast turning counters and it is highly desirable to eliminate it as much as possible. Although many attempts have been made to provide a small compact counter without extensive gearing between radices, none, as far as we are aware has ever been successful when carried out into practice.

The present invention in its broadest aspects contemplates an incremental display device having a display window. Circular mounting means are disposed next to said window. Polygon members having equi-angular ends and rectangular faces are mounted for free axial rotation around said circular mounting means so that the rectangular faces of the polygon members will be displayed in the window. Along the circular path of travel of the polygon members, there are turning means to turn each polygon an angle corresponding to one of its faces as it passes the turning means. In this way, the different faces of the polygon are sequentially displayed in the display window. Advantageously, the elongated polygon members are prism members and each prim member is turned one-third of a turn as it passes the turning means.

Therefore, an object of the present invention is to provide a cyclic incremental display device.

Another object of the present invention is to provide such a device which is of simple construction and of small size.

Still another object of the present invention is to provide a substantially gearless cyclic incremental display device or angle counter.

Other objects and advantages of the invention will become clearer from the following description taken in conjunction with the accompanying drawing, in which:

FIG. 1 is an exploded view of the preferred embodiment of the display device contemplated herein as applied to the 36 most significant digits of a 360° angle counter;

FIG. 2 provides a side view of the sequential arrangement of the incremental units, shown in FIG. 1, showing how these units are disposed in the device at rest;

Figure 5B:
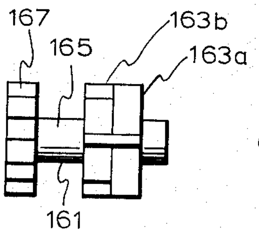
Figure 5A:
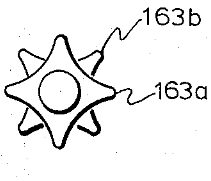
Figure 5C:
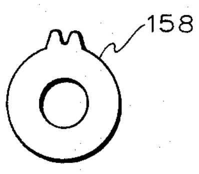
Figure 5D:
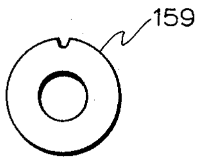
Figure 4:
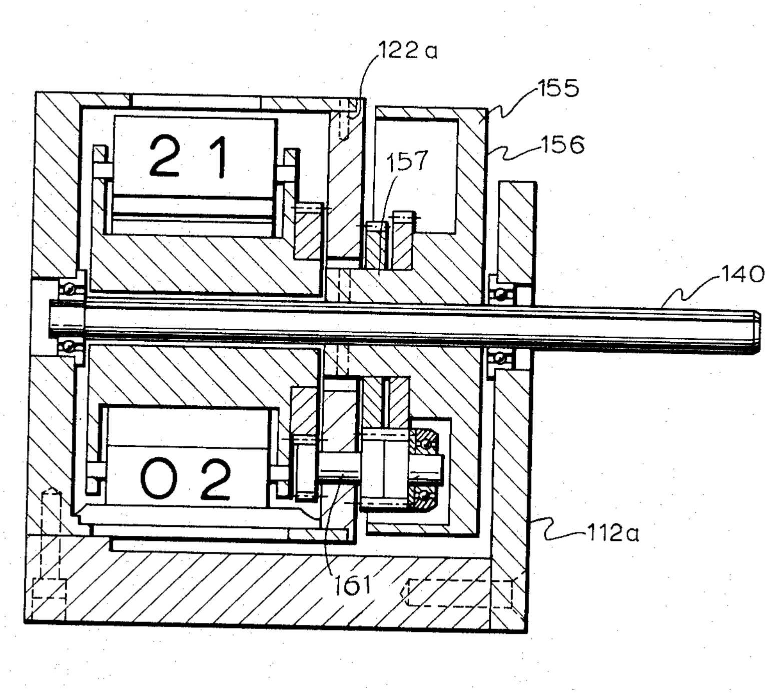
FIG. 4 illustrates the coupling of the 36 most significant digit arrangement of FIG. 1 in a complete display device having a least significant row of digits.

FIG. 5*a* shows a front view of some of the gearing components used in the arrangement depicted in FIG. 4;

FIG. 5*b* provides a side view of the components shown in FIG. 5*a*;

FIG. 5*c* shows a front view of another gearing component used to drive the gearing component shown in FIG. 5*a*; and FIG. 5*d* is a front view of a gearing component used for locking the gearing component shown in FIG. 5*a*.

Although an angle counter should provide information as to the 360°, the present invention is primarily concerned with the first two most signifiacnt digits, i.e., the counting of angles in ten degree increments. Shown in the drawing is an angle counter 100 having a housing 112 mounted on a stand 114. Stand 114 is an L-shaped bracket and has a base 116 designed to rest or be fastened horizontally and a vertical support arm 118 to which outer case 112 is fastened, e.g., by screws 120. Outer case 112 is an open cylindrical cup having a circular bottom wall 122 and a cylindrical inner wall 124. Circular bottom wall 122 is fastened by screws 120 to support arm 118. A lateral window 126 is located in cylindrical side wall 124 opposite base 116. This window 126 is a rectangular parallel to the cylindrical axis of cylindrical wall 124, but does not extend clear across the wall. The shorter sides of the rectangular window are separated from the ends of the cylindrical side wall 124 by short strips 128 and 129. At the bottom of outer case 112 in cylindrical wall 124, where the cylindrical wall rests on base 116, is a turning station 130, whose construction and function will be described shortly.

The digits 00 to 35, which will be displayed in lateral window 126, are displayed on prisms **134*a*, 134*b***, etc., i.e., each prism has three sets of two digits as shown on the following table:

*Table*

| | | | |
|---|---|---|---|
| First Prism | 00 | 12 | 24 |
| Second Prism | 01 | 13 | 25 |
| Third Prism | 02 | 14 | 26 |
| Fourth Prism | 03 | 15 | 27 |
| Fifth Prism | 04 | 16 | 28 |
| Sixth Prism | 05 | 17 | 29 |
| Seventh Prism | 06 | 18 | 30 |
| Eighth Prism | 07 | 19 | 31 |
| Ninth Prism | 08 | 20 | 32 |
| Tenth Prism | 09 | 21 | 33 |
| Eleventh Prism | 10 | 22 | 34 |
| Twelfth Prism | 11 | 23 | 35 |

The prims **134*a*, etc., are mounted on circular mounting means, e.g., mounting disc 136, each prism being disposed on a prism axle 138 passing axially through the prism. Disc 136 is mounted on a main shaft 140, which is turned by a knob 142. To protect the prisms and disc, a disc-shaped end wall 144** is provided.

Figures 1, 2:
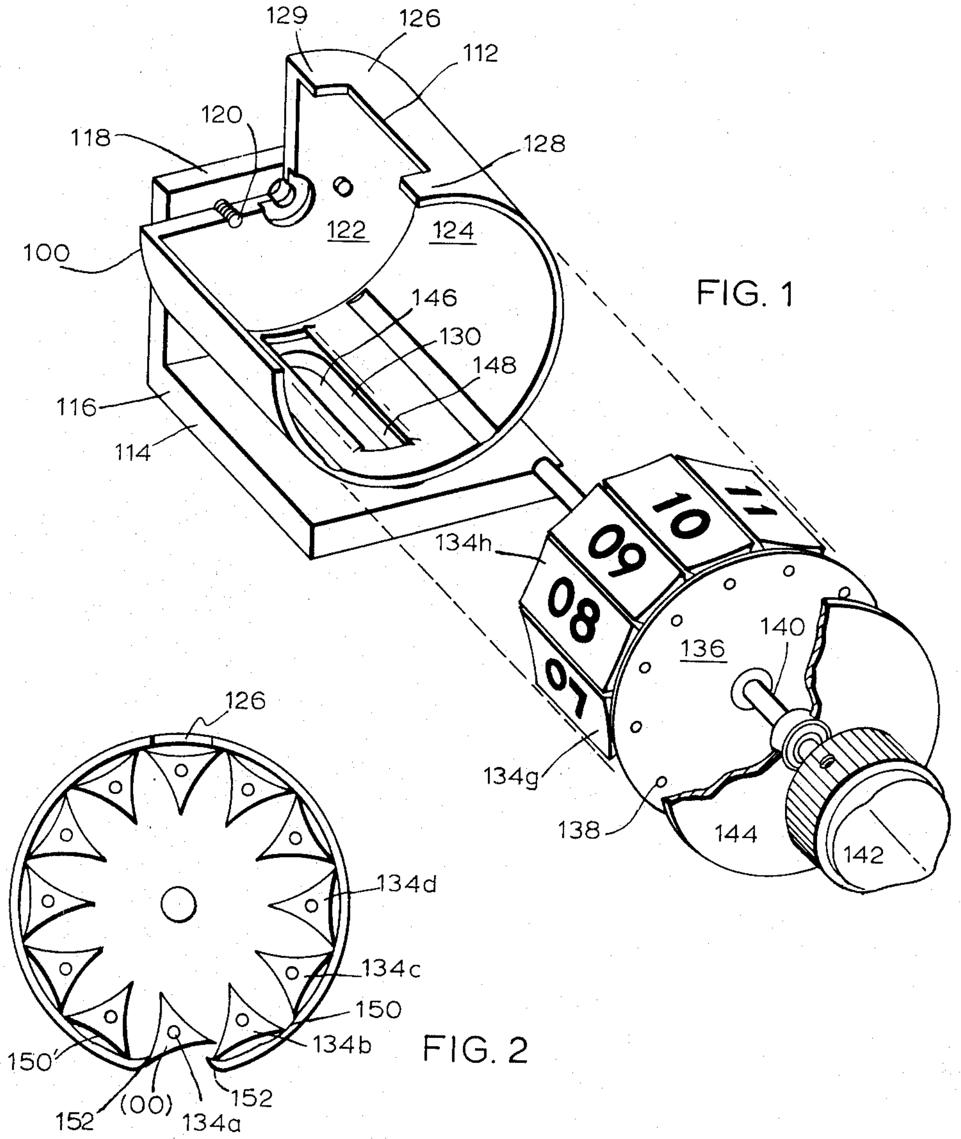
Figure 3:
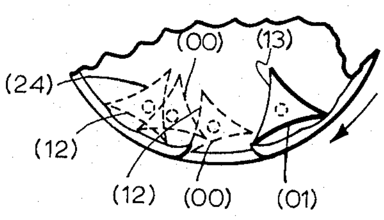
FIG. 3 depicts a portion of FIG. 2 when the device is in motion.

Initially, the numbers on the prism are so set that the group from (00) to (11) will be sequentially displayed in the window 126 as the mounting disc is turned. After each set of numbers has passed before the display window, it reaches the turning station 130, where it will be turned one-third of a turn to bring the second set of numerals in the display plane. This procedure is then repeated so as to display the third set of numerals, and then the first set again. To understand the operation of the turning station, it is necessary to study FIGS. 2 and 3. The prism **34*a* bearing number (00) has passed before window 126 and been displayed therein. It has now entered the turning station 130. Number (00) has been followed by numbers (01), (02) and (03) in window 126 and these have not yet entered the turning station 130 in the view shown in FIG. 2. Prism 34*a*** in the turning station must be turned one-third of a turn so that numeral (12) will then be riding along the inside periphery of the housing.

The width of the turning station 130 is slightly less than the width of one of the prism faces while the length of this turning station is slightly greater than the length of one of the prism faces. Also, sufficient space is provided outside of the housing for the prism to turn. Since in the present embodiment, purely for reasons of symmetry, the turning station is at the base, a chamber 146 is provided in the base having a wall 148. While turning, the prism will penetrate this chamber. The turning movement is accomplished by the combined action of an inner recess 150 and an inwardly projecting knife edge 152. As prism member approaches knife edge 152, the prism is tilted on its axle so one corner or edge is forced inward. The opposite corner or edge is thus forced outwards and enters recess 150. At a certain distance past the center between the prism corners, the lever action of the knife edge will tilt the prism; the opposite corner is now forced inward, but the one corner is tilted outwards and is engaged by a second inwardly pointing knife edge 152, causing the prism to swing on its axle so that the (00) number swings in and the (12) number swings into place along the periphery. To enhance this action, it is advantageous to have the rectangular prism faces slightly concave. In the drawing, the degree of concavity has, in fact, been somewhat accentuated. This degree of concavity is not necessary for the counter operation but may detract from the appearance. A lesser degree of concavity will work as well and will be almost invisible to the eye.

Numeral (12) is now disposed along the inner wall 124 of the housing while prism **134*b* has with its face (01) entered the turning station. Again the prism is turned one-third of a turn so that (13) will be disposed peripherally alongside (12). In the same way, when (02), (03), etc., enter the turning station, each prism is turned so that (14) and (15) take their places after (12), (13) along inner wall 124**.

Finally (12), (13), (14), (15) pass before display window 126 and continue on to turning station 130. This time, as the prisms are each sequentially turned one-third of a turn, it is the numerals (24), (25), (26), etc., which are placed along wall 124 to be eventually displayed in window 126. As the numeral (24) passes the turning station 130, (00) is again disposed peripherally along wall 124, then (01), and the sequence is repeated. One of the key features of the invention is that the clearance between the inner wall 124 and the prisms is so small that when a number, e.g., (00) is disposed along the wall, the prism cannot turn. It is for this reason that lateral window 126 does not go clear across the cylinder but has short strips 128 and 129 at the ends. These short strips prevent the turning of the prism. By the same token, the opening in the turning station 130 must be clear across the length of the prism, permitting the prism to turn therein. The exact relationship of the inner recesses 150 and knife edge 152 can best be worked out by trial and error. The recess 150 must, of course, be such that when one edge of the prism is in the recess, the other edge must be able to pass the knife edge. The action of the turning station is, of course, reversible by the action of corresponding recess 150′ and knife edge 152′ on the other side of the station.

The foregoing arrangement provides a light weight, small, compact, 36-unit incremental display device. As is quite obvious, a 360° angle counter is what is required and, for this, an additional least significant row of digits is needed from 0 to 9. This means that the first sequential number to be displayed will be (00) (0); then (00) (1); (00) (2), etc., until (00) (09). At this point, the (00) must move out of the display window making room for (01) while the (0) again enters the display window to be followed by (1), (2) providing values of (01) (0); (01) (1); (01) (2), etc. As the (9) leaves the window, the next number must then be (02) (0).

At the outset, it is to be noted that while there are twelve prisms for the most significant digits, there are only ten least significant digits. This then requires some care in number size. The numbers on the prism must occupy as must as possible the width of the prism while the least significant digits are somewhat separated. In practice, the interrelationship of the two groups of numbers presents no problem on a 360° angle counter. The difference between ten numbers on one drum and twelve on the other is easily accounted for by a skilled draftsman so that the difference is not noticed by the eye. The coupling of the two cylinders, one with the least significant digits and the other with the most significant digits must, however, be accomplished in such a manner that the (00) to (35) numbers will be properly disposed sequentially in the widow so that all the numbers are properly centered and aligned. For appearance, it may even be desired to put an additional center strip in the window so that the numbers appear as (0) (0) (0); (0) (0) (1), etc. Furthermore, there must be no backlash and unnecessary vibrating movement of the (00) to (35) numbers with the rapid turning of the (0) to (9) digits.

The "ones" drum 155 shown in FIG. 4 is a hollow cylinder with an end wall 156 and has a set of numbers around the outer surface of the cylinder going from (0) to (9) of a size which will be readily integrated with the two-digit arrangement on the prisms and is mounted on main shaft 140 by a central hub 157. Integral with drum 155 on hub 157 is a ratchet arrangement having a two-tooth gear 158 and a one-tooth spacer segment 159 also mounted on the main shaft 140. These parts of the ratchet arrangement shown individually in FIGS. *5c* and *5d* are disposed axially one over the other. Within the housing **112*a* is a transfer mechanism 161 mounted between the "ones" drum 155 and the "tens and hundreds" drum in a housing wall 122*a*. The transfer mechanism 161 consists of a four and eight-tooth pinion 163*a* and 163*b*** shown in FIGS. *5a* and *5b* mounted on one end of auxiliary shaft 165. These are disposed one over the other axially. These two pinions **163*a* and 163*b* are set opposite two-tooth gear 158 and one-tooth spacer segment 159. One of the pinions is locked against movement by the spacer segment 159 whose curve fits into the curved space between the teeth of pinion 163*a* until the spacer segment open space is reached. At this point, the two-tooth gear 158 engages the opposite tooth of pinion 163*b* causing it to twist 90° so that transfer gear 167 at the other end of the transfer mechanism also turns. Transfer gear 167 then drives main gear 169 coupled to the mounting means of the prisms. The gear ratio between transfer gear 167 and main gear 169 is so set that for each one-quarter turn of the transfer gear, the main gear will turn one-twelfth of a turn to display another prism before the lateral window. Therefore, the two-tooth gear 158 is so set as to turn pinion 163*b*** as the "ones" drum swings from (9) to (0) displaying another pair of numbers in the prisms section.

It is to be observed, therefore, that the present invention provides for an incremental display device such as an angle counter where a predetermined series of indicators or numbers are sequentially displayed in a rectangular display window of a housing with an inner cylindrical wall.

The numbers to be displayed are contained on prism members having equi-angular ends and rectangular faces. These prism members are circumferentially mounted in said housing around a circular mounting means, each prism being able to rotate so that the prism faces can sequentially appear in the display window. The prisms move along the inner cylindrical wall of the housing and are turned one-third of a turn as they pass a turning station having a chamber which the prisms can at least partly enter for turning. The turning action is accomplished by an inwardly projecting first knife edge at one side of the chamber which forces one prism edge passing over the knife edge to tilt inwardly. This causes the opposite prism edge to tilt outwardly and a recess is provided properly spaced from the knife edge for the prism's opposite edge to tilt outwardly. As the prism advances over the one knife edge, the opposite prism edge is then tilted inwardly while the one prism edge tilts outwardly and is caught by a second knife edge on the other side of the chamber. This flips the prism over one-third of a turn. This arrangement is particularly useful in providing the two most significant digits, i.e., the "tens" and "hundreds" digits in an angle counter. By this arrangement, numbers between (00) to (36) can be provided on twelve prisms. To provide numbers between (000) and (360) a single "ones" drum is necessary having numbers between (0) and (9). The two drums are coupled by gearing and transfer means which will turn the "tens" and "hundreds" drum one-twelfth of a turn for each complete turn of the "ones" drum. The gearing and transfer means include a two-tooth gear and a one-tooth spacer fixed to the "ones" drum, a pair of four-tooth pinions on an auxiliary shaft disposed axially one over the other opposite the two-tooth gear and the one-tooth spacer with the teeth of one pinion offset one-eighth of a turn from the teeth of the other, and gearing between the auxiliary shaft and the "tens" and "hundreds" drum of a ratio that with each one-quarter turns of the transfer gear the "tens" and "hundreds" drum will turn one-twelfth of a turn.

While there has been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

We claim:

1. An angle counter, comprising in combination:
a housing with an inner cylindrical wall with a display window in said wall extending axially partially across the wall;
circular mounting means disposed adjacent said window;
prism members having equi-angular ends and rectangular faces mounted for free axial rotation around said mounting means sliding along said wall, the prism axes being parallel to the wall cylindrical axis, the rectangular prism faces being displayed in said window during rotation of said mounting means, a set of digits in each of said prism faces, arranged for cyclic incrementation; and,
a turning station in said housing including a chamber along said wall which the prisms can at least partially enter, at least one inwardly projecting knife edge at one side of the chamber and at least one recess in said wall spaced from the knife edge, said knife edge causing the tilting of each prism as it passes thereover displaying a different set of digits each time a prism face is displayed in said window.

2. An angle counter as claimed in claim 1, said turning station including an inwardly projecting first knife edge at one side of the chamber and a first recess in said wall spaced therefrom, an inwardly projecting second knife edge at the other side of said chamber and a second recess spaced therefrom.

3. An angle counter as claimed in claim 2, said prism faces being slightly concave.

4. An angle counter as claimed in claim 3, said circular mounting means and prisms constituting a first drum, the digits in said faces forming a first set of digits, said angle counter including a second drum coaxially mounted with said first drum, with a second set of digits disposed for sequential display thereon, and, gearing between said first and second drums to turn said first drum the angle corresponding to one prism face for each revolution of said second drum.

5. An angle counter, comprising in combination:
a housing with an inner cylindrical wall with a display window in said wall extending axially partially across the wall;
circular mounting means disposed adjacent said window;
twelve prism members having equi-angular ends and rectangular faces mounted for free axial rotation around said mounting means sliding along said wall, the prism axes being parallel to the wall cylindrical axis, the rectangular prism faces being displayed in said window during rotation of said mounting means, and one set of digits from (00) to (35) in each of said prism faces sequentially arranged for cyclic incrementation; and,
a turning station in said housing including a chamber along said wall where the prisms can at least partially enter, first and second inwardly projecting knife edges at the one and the other side of said chamber, first and second recesses in said wall spaced from said knife edges.

6. An angle counter as claimed in claim 5, said prism faces being slightly concave.

7. An angle counter as claimed in claim 5, said circular mounting means and prisms constituting a first drum, the digits in said faces forming a first set of digits, said angle counter including, a second drum coaxially mounted with said first drum with a second set of digits from (0) to (9) disposed for sequential display thereon, and, gearing between said first and second drums to turn said first drum the angle corresponding to one prism face for each revolution of said second drum.

References Cited by the Examiner

UNITED STATES PATENTS

| | | | |
|---|---|---|---|
| 865,356 | 9/1907 | Carr | 40—76 X |
| 928,990 | 7/1909 | Lawson | 40—33 |
| 932,725 | 8/1909 | De Soria | 40—76 |
| 3,112,066 | 11/1963 | Brame | 235—1 |
| 3,137,444 | 6/1964 | Harada | 235—117 |

FOREIGN PATENTS

| | | |
|---|---|---|
| 483,586 | 1/1930 | Germany. |
| 15,111 | 1909 | Great Britain. |

LEO SMILOW, *Primary Examiner.*